No. 742,968. PATENTED NOV. 3, 1903.
H. P. CHURCHILL.
SPEED INDICATOR.
APPLICATION FILED FEB. 20, 1903.
NO MODEL.
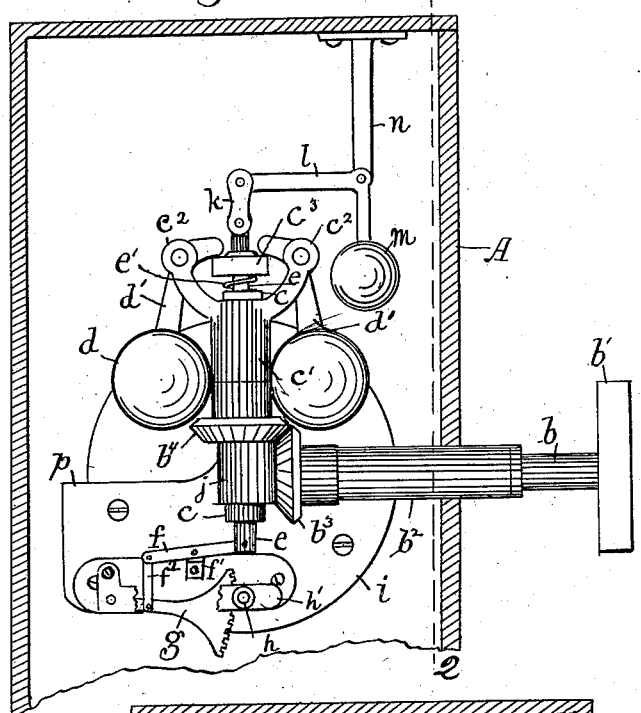

No. 742,968.

Patented November 3, 1903.

UNITED STATES PATENT OFFICE.

HENRY P. CHURCHILL, OF PORTLAND, MAINE.

SPEED-INDICATOR.

SPECIFICATION forming part of Letters Patent No. 742,968, dated November 3, 1903.

Application filed February 20, 1903. Serial No. 144,187. (No model.)

*To all whom it may concern:*

Be it known that I, HENRY P. CHURCHILL, a citizen of the United States of America, and a resident of Portland, Cumberland county, State of Maine, have invented certain new and useful Improvements in Speed-Indicators, of which the following is a specification.

My invention relates to a speed-recorder of that class having a dial with an indicating-hand connected with centrifugal balls, so that as the balls are thrown out by the revolution of the machine the hand is turned to indicate the speed or rate of revolution.

The object of the invention is to so construct the recorder that it will indicate quickly small variations of speed and so that it shall be particularly sensitive to variations of low speed.

I illustrate my invention by means of the accompanying drawings, in which—

Figure 1 is a front elevation of my mechanism, showing the casing in section; and Fig. 2 is a section on the line $z$ $z$ of Fig. 1.

A represents the casing in which the indicator is inclosed, and $b$ is the main shaft, having the pulley $b'$ on its end. The shaft $b$, which is horizontal, is journaled in the bearing $b^2$, which is formed as part of the standard $j$, having a base $i$. On the end of the shaft $b$ is a bevel-gear $b^3$, engaging a similar gear $b^4$ on the upright shaft $c$, the lower end of which is journaled in the end of the standard $j$. On the shaft $c$ and turning with it is a sleeve $c'$, having arms $c^2$, to which are pivoted the L-shaped levers $d'$, having depending vertical arms, on the lower ends of which are the centrifugal balls $d$, the short horizontal arms of these levers resting on a disk $c^3$ on the spindle $e$, which extends centrally through the axis of the shaft $c$. A weight is provided for holding the disk in its normal position and to resist its downward motion through the action of the centrifugal balls. For this purpose I make use of an elbow-lever $l$, pivoted at its center to a standard $n$. Its vertical depending arm has on its lower end a weight $m$, while the outer end of its horizontal arm connects by means of the link $k$ with the upper end of the spindle $e$. Any downward motion of the spindle is thus resisted by the weight $m$, and as its first motion is nearly horizontal it offers little resistance at first and the resistance increases as the speed increases.

The rate of speed is indicated by a hand or pointer $h'$, which is secured to the end of a shaft $h$ and turns on a dial $r$. On the inner end of the shaft $h$ is a pinion $q$, Fig. 2, which engages a geared segment $g$, which segment is connected with the lower end of the spindle $e$ by means of the levers $f$ and $f^2$, the lever $f$ being pivoted to a bearing $f'$. Thus as the spindle rises and falls the segment $g$ turns the shaft $h$ and rotates the hand on the dial.

I provide a light spring $e'$, acting on the under side of the disk $e^3$ and tending to force it upward for the purpose of taking up any lost motion.

The operation of my device will be clearly seen from what has been said. The pulley $b'$ is belted to the shaft to be indicated, and the rotation of the shaft $b$ rotates the vertical shaft $c$ and throws out the balls $d$ by centrifugal motion. The spindle is depressed in proportion to the speed and the throw of the balls, and the indicating-hand indicates on the dial the rate of speed.

The device is adapted to be used on engines of all kinds, on automobiles, and the like when the rate of speed is important.

I claim—

1. In a speed-indicator the combination of a horizontal and a vertical shaft connected by suitable gears, a pair of L-shaped centrifugal ball-arms having balls on their lower ends pivoted to the vertical shaft, a spindle within said vertical shaft, a disk on said spindle against which the other ends of said arms impinge, a weight for forcing said spindle upward, an indicator-shaft and an indicating-hand thereon, a pinion on said shaft, a geared segment engaging said pinion and levers connecting said segment with the lower end of said spindle.

2. In a speed-indicator, the combination of a horizontal and a vertical shaft connected by suitable gearing, a pair of L-shaped centrifugal ball-arms having balls at their lower ends pivoted to the vertical shaft, a spindle within said vertical shaft, a disk on said spindle against which the other ends of said arms impinge, an elbow-lever pivoted at its elbow and having a weight at the lower end of its depending arm, its other arm being connected with the upper end of said spindle, an indicator-shaft and an indicating-hand thereon, a pinion on said shaft, a geared segment engaging said pinion and levers connecting said segment with the lower end of said spindle.

Signed at Portland, Maine, this 23d day of January, 1903.

HENRY P. CHURCHILL.

Witnesses:
S. W. BATES,
L. M. GODFREY.